J. B. CROWELL.
Cattle Stanchion.
No. 59,190. Patented Oct. 30, 1866.
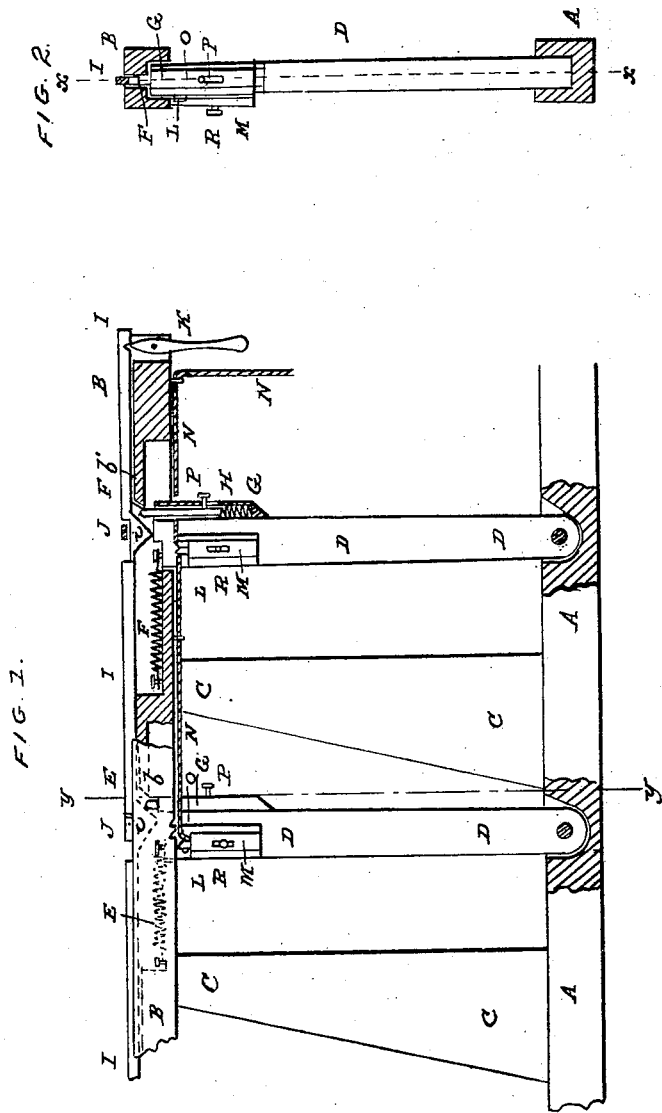

UNITED STATES PATENT OFFICE

JOHN B. CROWELL, OF NEWPORT, NEW HAMPSHIRE.

IMPROVEMENT IN STANCHIONS FOR CATTLE.

Specification forming part of Letters Patent No. 59,190, dated October 30, 1866.

*To all whom it may concern:*

Be it known that I, J. B. CROWELL, of Newport, in the county of Sullivan and State of New Hampshire, have invented a new and useful Improvement in Stanchions for Tying Cattle; and I do hereby declare that the following is a full, clear, and exact description thereof, which will enable others skilled in the art to make and use the same, reference being had to the accompanying drawings, forming a part of this specification, in which—

Figure 1 is a side view of a number of my improved stanchions, partly in section, through the line $x\ x$, Fig. 2. Fig. 2 is a vertical cross-section of the same, taken through the line $y\ y$, Fig. 1.

Similar letters of reference indicate like parts.

My invention consists in the combination of the rope, catch-bolts, spring-bolts, sliding bar, lever, and springs with each other, with the movable stanchions, and with the frame in which they are placed, so that the stanchions may be self-fastening, and so that all the cattle may be released at the same time or singly, as desired.

A is the lower, and B the upper, horizontal timbers of the frame. C are the stationary stanchions, the lower ends of which are secured to the timber A, and their upper ends to the timbers B. D are the movable stanchions, the lower ends of which are pivoted in mortises formed in the timber A, as shown in Figs. 1 and 2, and their upper ends enter long mortises formed in the timber B, as shown. E are coiled springs placed in a cavity formed in the timber B, as shown in Fig. 1. One end of the springs E are attached to the said timbers B, and their other ends to the upper ends of the movable stanchions D. These springs draw the upper ends of the stanchions D toward the stationary stanchions C whenever said stanchions D are released from the sliding catch-bolts, as hereinafter described.

F are bolts working in caps or slides G, attached to the edge of the stanchions D, as shown in Fig. 1. H are coiled springs placed between the lower end of the bolts F and the bottom of the caps G, which springs H force the said bolts up, so as to hold the upper ends of the stanchions D securely when the cattle are in place.

I is a long bar, sliding in a longitudinal groove formed in the upper side of the timber B, as shown in Figs. 1 and 2. The bar I is kept in place and prevented from moving too far in either direction by blocks J, attached to the upper side of the timber B, and entering long notches formed in the upper side of the bar I, as shown in Fig. 1.

K is a lever pivoted in the end of the timber B, the upper end of which enters a notch or mortise formed in the under side of the bar I, near its end, and by means of which the said bar I is moved back and forth, as desired.

Upon the under side of the bar I, directly above the upper ends of the movable stanchions D, are formed projections $i'$, having inclined sides, which, when the bar I is moved back by the lever K, come in contact with the upper ends of the bolts F and force them down below the catch $b'$, so that the stanchions D may be drawn back and the cattle released.

L are sliding catch-bolts working in caps or slides M, attached to the sides of the stanchions D, which, when the said stanchions are drawn back and the said bolts are forced up, enter one or the other of the notches formed upon the under side of the timber B, and hold the said stanchions in place while the cattle are passing out.

N is a rope, one end of which is attached to the bolt L farthest from the lever K, and which is connected with each of the other bolts L. The rope N passes over projections or rollers attached to the sides of the stanchions D, a little above the point at which the said rope is connected to the said bolts, so that by pulling upon the free end of the rope N, which projects near the lever K, the stanchions D are drawn back, and by the same operation the bolts L are forced up, so as to enter one or the other of the notches formed in the under side of the timber B, as before described, and hold the said stanchions securely in the position to which they have been drawn back.

In this position the stanchions are held until the cattle are again to be tied up, when, in putting their heads into their places between the stationary and movable stanchions, they press against the movable stanchions D, pushing them slightly back. This releases the bolts L, which drop down, allowing the springs E to draw the upper ends of the said stanchions D forward, when the springs H force the bolts F up past the catch $b'$, and the cattle are secured in place.

P and R are knobs, the shanks of which pass in through slots in the caps G and M, and are secured to the bolts F and L, so that the said bolts may be operated or the cattle released and tied up singly when desired.

I claim as new and desire to secure by Letters Patent—

1. The combination of the bolts L and rope N with each other, and with the movable stanchions D and timber B, substantially as herein shown and described, and for the purposes set forth.

2. The combination of the bolts F and springs H with the movable stanchions D and timber B, substantially as described, and for the purpose set forth.

3. The combination of the bar I and lever K with the bolts F and timber B, substantially as shown and described, and for the purpose set forth.

4. The combination of the springs E with the stanchions D and timber B, substantially as herein shown and described, and for the purpose set forth.

JOHN B. CROWELL.

Witnesses:
 ARBA S. COFFIN,
 D. R. DAY.